(12) United States Patent
Ikoshi et al.

(10) Patent No.: US 12,734,820 B2
(45) Date of Patent: Sep. 15, 2026

(54) INKJET RECORDING METHOD

(71) Applicant: FUJIFILM Corporation, Tokyo (JP)

(72) Inventors: Masao Ikoshi, Kanagawa (JP); Tadashi Kyoso, Kanagawa (JP); Taiga Mizoe, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 163 days.

(21) Appl. No.: 18/888,432

(22) Filed: Sep. 18, 2024

(65) Prior Publication Data

US 2025/0010632 A1 Jan. 9, 2025

Related U.S. Application Data

(63) Continuation of application No. PCT/JP2023/011546, filed on Mar. 23, 2023.

(30) Foreign Application Priority Data

Mar. 24, 2022 (JP) ................................ 2022-048837

(51) Int. Cl.

*B41J 2/18* (2006.01)
*B41J 2/21* (2006.01)
*C09D 11/322* (2014.01)

(52) U.S. Cl.

CPC ............... *B41J 2/2117* (2013.01); *B41J 2/18* (2013.01); *C09D 11/322* (2013.01)

(58) Field of Classification Search

CPC ..................................................... B41J 2/2117

See application file for complete search history.

(56) References Cited

U.S. PATENT DOCUMENTS 6,451,103 B1 * 9/2002 Uemura .............. C09B 67/0091 106/497
2004/0061747 A1 4/2004 Nakao et al.
(Continued)

FOREIGN PATENT DOCUMENTS

CN 103289471 A 9/2013
CN 109130523 A 1/2019
(Continued)

OTHER PUBLICATIONS

Written Opinion (PCT/ISA/237) dated May 23, 2023 issued by the International Searching Authority in International Application No. PCT/JP2023/011546.
(Continued)

*Primary Examiner* — Shelby L Fidler
(74) *Attorney, Agent, or Firm* — Sughrue Mion, PLLC

(57) ABSTRACT

Provided is an ink jet recording method including a step of circulating an ink and jetting the ink from an ink jet head to apply the ink onto a recording medium, in which the number of white large particles as a white pigment having a particle diameter in a range of 0.8 μm to 5 μm in the ink is $1.00 \times 10^4$ pieces/$cm^3$ or greater, the circulation flow passage includes a circulation tube for returning the ink to the ink jet head, and a velocity ratio (1) described below is $5.0 \times 10^3$ or greater and $1.4 \times 10^5$ or less. Vc represents a circulation flow rate (cm/s) of the ink in a connecting portion between the circulation tube and the ink jet head, Vslp represents a sedimentation velocity (cm/s) of the white large particles, which is defined by a predetermined equation, and Pn represents the number of the white large particles (pieces/$cm^3$).

$$\text{Velocity ratio (1)} = Vc/(Vslp \times \log(Pn))$$

(Continued)

5 Claims, 1 Drawing Sheet

(56) References Cited

U.S. PATENT DOCUMENTS

| | | | | |
|---|---|---|---|---|
| 2004/0259978 | A1* | 12/2004 | Tani | C09D 11/40<br>523/160 |
| 2013/0155160 | A1 | 6/2013 | Shiono | |
| 2013/0222503 | A1 | 8/2013 | Okuda et al. | |
| 2015/0115202 | A1 | 4/2015 | Kagata | |
| 2016/0083604 | A1 | 3/2016 | Steert et al. | |
| 2020/0239722 | A1* | 7/2020 | Uchida | C09B 67/009 |

FOREIGN PATENT DOCUMENTS

| | | | | |
|---|---|---|---|---|
| JP | 2000-327964 | A | 11/2000 | |
| JP | 2006-056234 | A | 3/2006 | |
| JP | 2013-129708 | A | 7/2013 | |
| JP | 2017-193695 | A | 10/2017 | |
| JP | 2019-155858 | A | 9/2019 | |
| JP | 2019-209513 | A | 12/2019 | |
| WO | WO-2020059668 | A1 * | 3/2020 | C09D 11/322 |

OTHER PUBLICATIONS

International Search Report (PCT/ISA/210) dated May 23, 2023 issued by the International Searching Authority in International Application No. PCT/JP2023/011546.

International Preliminary Report on Patentability (with translation of Written Opinion) dated Sep. 24, 2024, issued in International Application No. PCT/JP2023/011546.

Extended European Search Report issued Jul. 9, 2025 in European Application No. 23775030.2.

Communication dated Jan. 26, 2026 in Chinese Application No. 202380029032.1.

* cited by examiner

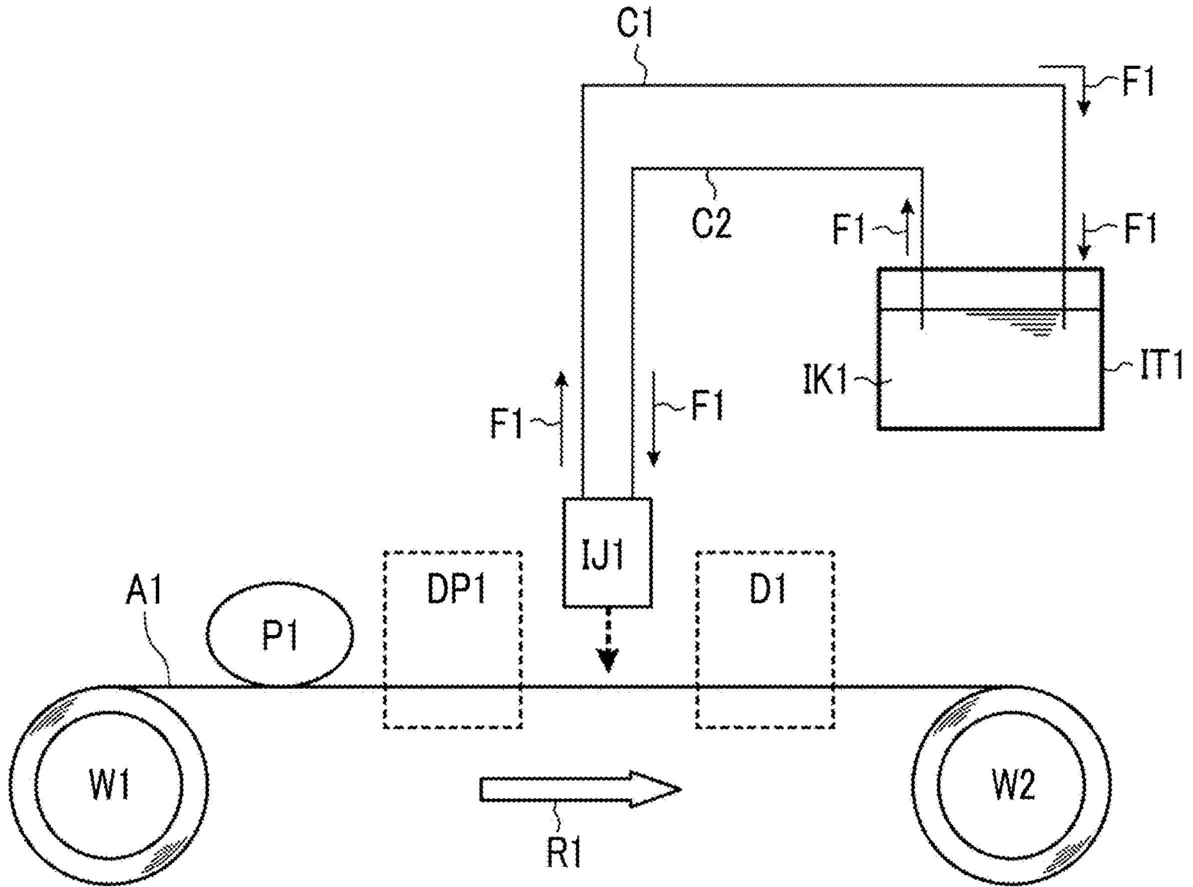
C1
F1
C2
F1
F1
IK1
IT1
F1
F1
IJ1
DP1
D1
A1
P1
W1
W2
R1

INKJET RECORDING METHOD

CROSS-REFERENCE TO RELATED APPLICATIONS

This application is a continuation application of International Application No. PCT/JP2023/011546, filed Mar. 23, 2023, the disclosure of which is incorporated herein by reference in its entirety. Further, this application claims priority from Japanese Patent Application No. 2022-048837, filed Mar. 24, 2022, the disclosure of which is incorporated herein by reference in its entirety.

BACKGROUND OF THE INVENTION

1. Field of the Invention

The present disclosure relates to an ink jet recording method.

2. Description of the Related Art

In recent years, ink jet recording using a white ink has been examined.

For example, JP2013-129708A discloses, as a white ink with satisfactory whiteness and excellent jetting stability, a white ink for ink jet recording which contains a white pigment having an average particle diameter of 200 nm or greater and 400 nm or less and consisting of a metal oxide and satisfies Expression (1).

$$0.5\times A \le V \le 1.3\times A \qquad (1)$$

(In Expression (1), A represents the content (% by mass) of the white pigment contained in the white ink for ink jet recording. Further, V represents the proportion (%) of the volume of the white pigment in the total volume of the white ink for ink jet recording in a case where the white pigment is completely sedimented in the white ink for ink jet recording.

SUMMARY OF THE INVENTION

As a result of examination conducted by the present inventors, it has been found that in an ink jet recording method using an ink containing water and a white pigment which is a titanium dioxide particle, the color consistency of an image to be recorded may be impaired (that is, the color variation of the image is increased) during long-term run (that is, in a case where image recording is continuously performed), and/or the jetting stability of the ink may be degraded.

An object to be achieved by an embodiment of the present disclosure is to provide an ink jet recording method that uses an ink containing water and a white pigment which is a titanium dioxide particle and that has excellent color consistency during long-term run and excellent jetting stability of the ink.

The present disclosure includes the following aspects.

<1> An ink jet recording method using an ink jet recording device that includes an ink jet head for jetting an ink, and a circulation flow passage for circulating the ink discharged from the ink jet head and returning the ink to the ink jet head, the method comprising: circulating the ink in the circulation flow passage and jetting the ink from the ink jet head to apply the ink onto a recording medium, in which the ink contains water and a white pigment which is a titanium dioxide particle, the number of white large particles which are particles having a particle diameter of 0.8 μm to 5 μm in the white pigment of the ink is $1.00\times10^4$ pieces/cm$^3$ or greater, the circulation flow passage includes a circulation tube connected to the ink jet head and returning the ink to the ink jet head, and a velocity ratio (1) defined by Equation (1) is $5.0\times10^3$ or greater and $1.4\times10^5$ or less.

$$\text{Velocity ratio (1)} = Vc/(Vslp\times\log(Pn)) \qquad \text{Equation (1)}$$

$$Vslp = \{(\rho-\rho w)gR^2\}/(18\eta) \qquad \text{Equation (A)}$$

In Equation (1), Vc represents a circulation flow rate of the ink in units of cm/s in a connecting portion between the circulation tube and the ink jet head, Vslp represents a sedimentation velocity of the white large particles in units of cm/s, which is defined by Equation (A), and Pn represents the number of the white large particles in the ink in units of pieces/cm$^3$.

In Equation (A), ρ represents 4.23, ρw represents a density of a solvent in the ink in units of g/cm$^3$, g represents an acceleration of gravity in units of cm/s$^2$, and R represents a median diameter of the white large particles in units of cm. η represents a viscosity of the solvent in the ink at 30° C. in units of g/cm·s.

<2> The ink jet recording method according to <1>, in which a velocity ratio (2) defined by Equation (2) is $1.5\times10^3$ or greater.

$$\text{Velocity ratio (2)} = \text{velocity ratio (1)}\times(1-\cos\theta) \qquad \text{Equation (2)}$$

In Equation (2), θ represents a contact angle of the ink in units of ° with respect to an inner surface of the circulation tube.

<3> The ink jet recording method according to <1> or <2>, in which the ink is circulated through an ink tank, and a velocity ratio (3) defined by Equation (3) is 10.0 or greater.

$$\text{Velocity ratio (3)} = \text{velocity ratio (1)}\times(1/L) \qquad \text{Equation (3)}$$

In Equation (3), L represents a length of the circulation tube from the ink tank to the ink jet head in units of cm.

<4> An ink jet recording device configured to be used in the ink jet recording method according to any one of <1> to <3>, the device comprising:

an ink jet head for jetting an ink containing water and a white pigment which is a titanium dioxide particle, and a circulation flow passage for circulating the ink discharged from the ink jet head and returning the ink to the ink jet head.

<5> The ink jet recording device according to <4>, wherein the circulation flow passage includes a circulation tube connected to the ink jet head and returning the ink to the ink jet head.

According to an embodiment of the present disclosure, it is possible to provide an ink jet recording method that uses an ink containing water and a white pigment which is a titanium dioxide particle and that has excellent color consistency during long-term run and excellent jetting stability of the ink.

BRIEF DESCRIPTION OF THE DRAWINGS

FIG. 1 is a view conceptually showing an example of an ink jet recording device used to perform an ink jet recording method of the present disclosure.

DESCRIPTION OF THE PREFERRED EMBODIMENTS

In the present specification, a numerical range shown using "to" indicates a range including the numerical values described before and after "to" as a minimum value and a maximum value, respectively.

In a numerical range described in a stepwise manner in the present specification, an upper limit or a lower limit described in a certain numerical range may be replaced with an upper limit or a lower limit in another numerical range described in a stepwise manner. Further, in a numerical range described in the present specification, an upper limit or a lower limit described in a certain numerical range may be replaced with a value described in an example.

In the present specification, in a case where a plurality of substances corresponding to respective components in a composition are present, the amount of the respective components in the composition indicates the total amount of the plurality of substances present in the composition unless otherwise specified.

In the present specification, a combination of two or more preferred embodiments is a more preferred embodiment.

In the present specification, the meaning of the term "step" includes not only an independent step but also a step whose intended purpose is achieved even in a case where the step is not clearly distinguished from other steps.

In the present specification, the term "image" denotes an entire film formed by applying the pretreatment liquid and the ink in this order, the term "ink jet recording" denotes image recording by an ink jet recording system, and the term "image recording" denotes formation of an image (that is, a film).

Further, the concept of "image" in the present specification also includes a solid image.

In the present specification, the term "amount to be applied" denotes the mass (g) to be applied converted per area of 1 $m^2$ in units of $g/m^2$ unless otherwise specified.

In the present specification, the term "solvent" denotes an organic solvent unless otherwise specified.

In the present specification, the concept of "(meth)acrylate" includes both acrylate and methacrylate. In addition, the concept of "(meth)acryl" includes both acryl and methacryl.

Ink Jet Recording Method

An ink jet recording method of the present disclosure (hereinafter, also simply referred to as "recording method") is an ink jet recording method using an ink jet recording device that includes an ink jet head for jetting an ink, and a circulation flow passage for circulating the ink discharged from the ink jet head and returning the ink to the ink jet head, the method including: a step of circulating the ink in the circulation flow passage and jetting the ink from the ink jet head to apply the ink onto a recording medium (hereinafter, also referred to as "ink applying step"), in which the ink contains water and a white pigment which is a titanium dioxide particle (hereinafter, also simply referred to as "white pigment"), the number of white large particles which are particles having a particle diameter of 0.8 μm to 5 μm in the white pigment of the ink (that is, Pn in Equation (1)) is $1.00\times10^4$ pieces/$cm^3$ or greater, the circulation flow passage includes a circulation tube connected to the ink jet head and returning the ink to the ink jet head, and a velocity ratio (1) defined by Equation (1) is $5.0\times10^3$ or greater and $1.4\times10^5$ or less.

The recording method of the present disclosure may include other steps in addition to the ink applying step as necessary.

$$\text{Velocity ratio (1)} = Vc/(Vslp \times \log(Pn)) \qquad \text{Equation (1)}$$

$$Vslp = \{(\rho - \rho w)gR^2\}/(18\eta) \qquad \text{Equation (A)}$$

In Equation (1), Vc represents a circulation flow rate of the ink in units of cm/s in a connecting portion between the circulation tube and the ink jet head, Vslp represents a sedimentation velocity of the white large particles in units of cm/s, which is defined by Equation (A), and Pn represents the number of the white large particles in the ink in units of pieces/$cm^3$.

In Equation (A), ρ represents 4.23, ρw represents a density of a solvent in the ink in units of $g/cm^3$, g represents an acceleration of gravity in units of $cm/s^2$, and R represents a median diameter of the white large particles in units of cm.

η represents a viscosity of the solvent in the ink at 30° C. in units of g/cm·s.

The recording method of the present disclosure is an ink jet recording method using an ink containing water and a white pigment which is a titanium dioxide particle, and enables improvement of the color consistency during long-term run and the jetting stability of the ink.

The reason why such an effect is exhibited is assumed as follows.

As a result of examination conducted by the present inventors, it has been found that in an ink jet recording method using an ink containing water and a white pigment which is a titanium dioxide particle, the color consistency of an image to be recorded may be impaired (that is, the color variation of the image is increased) during long-term run (that is, in a case where image recording is continuously performed). The problem of color consistency during long-term run is particularly significant in a case where the number of white large particles in the ink is set to $1.00\times10^4$ pieces/$cm^3$ or greater for the purpose of improving the covering property by a white image and the like. That is, it is considered that degradation of the color consistency during long-term run is a problem caused by the sedimentation of white large particles.

Therefore, in the recording method of the present disclosure, the velocity ratio (1) corresponding to the ratio of the circulation flow rate (Vc) of the ink to the sedimentation velocity (Vslp) of the white large particles defined by Equation (A) is set to $5.0\times10^3$ or greater by circulating the ink during image recording. In this manner, it is considered that the sedimentation of the white large particles can be suppressed, and as a result, degradation of the color consistency during long-term run can be suppressed.

Meanwhile, as a result of examination conducted by the present inventors, it has been found that a decrease in jetting stability during long-term run can be suppressed by limiting the above-described velocity ratio (1) to $1.4\times10^5$ or less.

As described above, in the recording method of the present disclosure, it is considered that the color consistency during long-term run and the jetting stability of the ink can be improved by setting the velocity ratio (1) to $5.0\times10^3$ or greater and $1.4\times10^5$ or less.

Ink Jet Recording Device

In the recording method of the present disclosure, an ink jet recording device that includes an ink jet head for jetting an ink containing water and a white pigment which is a titanium dioxide particle, and a circulation flow passage for circulating the ink discharged from the ink jet head and returning the ink to the ink jet head is used.

(Ink Jet Head)

The ink jet recording device of the present disclosure includes an ink jet head (for example, an ink jet head IJ1 in FIG. 1 described below) that jets an ink containing water and a white pigment which is titanium dioxide particles.

As the ink jet head, a known ink jet head can be used without particular limitation.

The method of jetting the ink from the ink jet head is not particularly limited, and any of known methods such as an electric charge control method of jetting an ink using an electrostatic attraction force, a drop-on-demand method (pressure pulse method) using a vibration pressure of a piezoelectric element, an acoustic ink jet method of jetting an ink using a radiation pressure by converting an electric signal into an acoustic beam and irradiating the ink with the acoustic beam, and a thermal ink jet (bubble jet (registered trademark)) method of heating an ink to form air bubbles and using the generated pressure may be used.

As the recording system using an ink jet head, particularly, a recording system, described in JP1979-59936A (JP-S54-59936A), of jetting an ink from a nozzle using an action force caused by a rapid change in volume of the ink after being subjected to an action of thermal energy can be effectively used. As a recording system using an ink jet head, a method described in paragraphs 0093 to 0105 of JP2003-306623A can also be employed.

Further, examples of the system of the ink jet head include a shuttle system of performing recording while allowing a short serial head to scan a recording medium in the width direction and a line system of using a line head in which recording elements are aligned in correspondence with the entire area of one side of a recording medium.

In the line system, image recording can be performed on the entire surface of the recording medium by scanning the recording medium in a direction intersecting the direction in which the recording elements are aligned. In the line system, a transport system such as a carriage that makes a short head scan in the shuttle system is not necessary. Further, in the line system, since movement of a carriage and complicated scanning control between the short head and the recording medium are not necessary as compared with the shuttle system, only the recording medium moves. Therefore, according to the line system, image recording at a higher speed than that of the shuttle system can be realized.

The resolution of the ink jet head is preferably 300 dpi or greater (more preferably 600 dpi or greater and still more preferably 800 dpi or greater).

Here, dpi stands for dot per inch, and 1 inch is 2.54 cm.

From the viewpoint of obtaining a high-definition image, the amount of the ink to be jetted from the ink jet head is preferably in a range of 1 picoliter (pL) to 10 pL and more preferably in a range of 1.5 pL to 6 pL.

The ink jet head jets the ink from a nozzle and discharges the ink for the purpose of ink circulation.

The discharge of the ink from the ink jet head may be performed in a form in which the ink is returned to the ink jet head through the circulation tube to be pushed out from the ink jet head.

The jetting and the discharge of the ink may be performed at the same time or at different timings.

Circulation tubes for ink circulation (for example, circulation tubes C1 and C2 in FIG. 1) are connected to the ink jet head.

The circulation tubes connected to the ink jet head form a circulation path for ink circulation alone or together with other members (for example, an ink tank, a liquid feeding pump, a filter, a heat exchanger, and a flowmeter).

(Circulation Flow Passage)

The ink jet recording device of the present disclosure includes a circulation flow passage for circulating the ink to return the ink to the ink jet head by circulating the ink discharged from the ink jet head.

The circulation flow passage includes at least a circulation tube (for example, the circulation tube C2 in FIG. 1 described below) that is connected to the ink jet head and returns the ink to the ink jet head.

The circulation flow passage may further include a circulation tube (for example, a circulation tube C1 in FIG. 1 described below) that is connected to the ink jet head and discharges the ink from the ink jet head.

In addition, the circulation flow passage may be formed of a circulation tube and a member other than the circulation tube.

Examples of the member other than the circulation tube include an ink tank for storing an ink (for example, a main tank or a buffer tank), a liquid feeding pump for feeding an ink, a filter for removing foreign matter from an ink, a degassing module for degassing an ink, a heat exchanger for adjusting the temperature of an ink, a flowmeter for measuring the flow rate of an ink, a joint, and a valve.

The ink jet recording device of the present disclosure may include other members in addition to the ink jet head and the circulation flow passage.

As the other members, members provided in the ink jet recording device can be appropriately employed without particular limitation.

(One Example of Ink Jet Recording Device)

Hereinafter, an example of the ink jet recording device used in the recording method of the present disclosure will be described with reference to the accompanying drawings.

Here, the ink jet recording device used in the recording method of the present disclosure is not limited to the following example.

FIG. 1 is a view conceptually showing an example of an ink jet recording device used for the ink jet recording method of the present disclosure.

As shown in FIG. 1, the ink jet recording device according to the present example is an example of an ink jet recording device including a transport mechanism that transports a recording medium by a roll-to-roll method, and is a device that allows an unwinding device W1 to unwind a recording medium A1 having a long film shape which has been wound in a roll shape, transports the unwound recording medium A1 in a direction indicated by a block arrow, allows the recording medium A1 to pass through a pretreatment liquid applying device P1, a pretreatment liquid drying zone DP1, an ink jet head IJ1, and a drying zone D1 in this order, and finally winds the recording medium A1 by a winding device W2.

In this example, the pretreatment liquid is a liquid to be applied to the recording medium before the ink is applied.

The pretreatment liquid contains, for example, water and an aggregating agent.

The pretreatment liquid will be described below.

The recording method of the present disclosure is not limited to the aspect of using the pretreatment liquid, and the ink may be applied to the recording medium without using the pretreatment liquid.

In this case, the pretreatment liquid applying device P1 and the pretreatment liquid drying zone DP1 can be omitted.

Further, since FIG. 1 is a conceptual view, the transport path of the recording medium A1 is simplified and illustrated such that the recording medium A1 is transported in one direction, but it goes without saying that the transport path of the recording medium A1 may actually be meandering.

As a method of transporting the recording medium A1, various web transport methods such as a drum and a roll can be appropriately selected.

The pretreatment liquid applying device P1, the pretreatment liquid drying zone DP1, the ink jet head IJ1, and the drying zone D1 are disposed in this order from the upstream side of the recording medium A1 in the transport direction (hereinafter, also simply referred to as "upstream side") on the downstream side of the recording medium A1 in the transport direction (hereinafter, also simply referred to as "downstream side") with respect to the unwinding device W1 for unwinding the recording medium A1.

The pretreatment liquid and the ink are respectively applied by the pretreatment liquid applying device P1 and the ink jet head IJ1.

In this case, at least one of the heating and drying of the pretreatment liquid in the pretreatment liquid drying zone DP1 or the heating and drying of the ink in the drying zone D1 can be performed.

In the drying zone DI, the heating and drying of the pretreatment liquid may be substantially performed in addition to the heating and drying of the ink.

Further, in a case where the recording medium passes through each drying zone in a state where the temperature of each drying zone is set to room temperature, the heating and drying can be omitted.

A surface treatment unit (not shown) for performing a surface treatment (preferably, a corona treatment) on the recording medium A1 may be provided on the upstream side of the pretreatment liquid applying device P1.

In addition, a cooling zone where the recorded image is cooled may be provided on the downstream side of the drying zone D1.

The ink jet head IJ1 may be a shuttle head, but a line head in which a large number of jetting ports (nozzles) are aligned in the width direction of the recording medium A1 having a long film shape is preferable from the viewpoint of speeding up image recording.

One end of the circulation tube C1 and one end of the circulation tube C2 are connected to the ink jet head IJ1. The other end of the circulation tube C1 and the other end of the circulation tube C2 are connected to the ink tank IT1.

In the ink jet recording device according to the present example, ink circulation in which the ink is discharged from the ink jet head IJ1 to the circulation tube C1 and the discharged ink is circulated and returned to the ink jet head IJ1 through the circulation tube C2 can be performed with the above-described configurations (see an arrow F1 in FIG. 1).

Although not shown, a degassing module for degassing an ink, a liquid feeding pump for feeding an ink, a filter for removing foreign matter, a heat exchanger for adjusting the temperature of an ink, and the like may be disposed in the middle of the circulation tubes C1 and C2.

In addition, the ink tank IT1 may be a main tank or a buffer tank. In a case where the ink tank IT1 is a buffer tank, a main tank (not shown) is connected to the ink tank IT1 which is the buffer tank.

Only one or a plurality of the ink jet heads IJ1 may be disposed.

For example, a plurality of the ink jet heads IJ1 may be disposed in the transport direction of the recording medium A1. In this manner, the white ink (hereinafter, also referred to as "white ink") and the colored ink can be applied.

Here, the colored ink denotes an ink of a color other than white. The concept of the colored ink includes not only a chromatic ink such as a cyan ink, a magenta ink, or a yellow ink, but also an achromatic ink such as a black ink (hereinafter, also referred to as "black ink"). Similarly, the concept of "colored image" in the present disclosure includes not only a chromatic image but also a black image (hereinafter, also referred to as "black image").

In a case where a plurality of the ink jet heads IJ1 are disposed, members (for example, the circulation tubes C1 and C2, and the ink tank IT1) for circulating the ink can be connected to each of the plurality of ink jet heads IJ1.

In the ink jet recording using the image recording device according to the present example, first, the recording medium A1 having a long film shape which has been wound in a roll shape is unwound by the unwinding device W1, the unwound recording medium A1 is transported in a direction of an arrow R1, the pretreatment liquid is applied onto the transported recording medium A1 by the pretreatment liquid applying device P1, the pretreatment liquid is dried in the pretreatment liquid drying zone DP1 as necessary, the ink is jetted from a nozzle (not shown) in the ink jet head IJ1 (see the dotted arrow in FIG. 1) onto the region to which the pretreatment liquid has been applied, and the ink is dried in the drying zone D1 as necessary.

In this manner, an image recorded material (that is, the recording medium A1 with an image) in which an image derived from the ink is recorded on the recording medium A1 is obtained.

Next, the image is cooled as necessary, and finally, the image recorded material (that is, the recording medium A1 with an image) is wound by the winding device W2.

In the ink jet head IJ1, the ink is jetted (see the dotted arrow in FIG. 1) and the ink is discharged to the circulation tube C1 (see the arrow F1 in FIG. 1).

The jetting and the discharge of the ink may be performed at the same time or at different timings.

The ink discharged into the circulation tube C1 is fed through a path of the circulation tube C1→the ink tank IT1→the circulation tube C2, and then returned to the ink jet head IJ1 through the circulation tube C2.

In this manner, in the ink jet recording device, the ink is jetted from the ink jet head IJ1 (see the dotted arrow in FIG. 1) and the ink is circulated (see the arrow F1 in FIG. 1).

The jetting and the circulation of the ink may be performed at the same time or at different timings.

The ink circulation may be performed continuously or intermittently.

Further, the paths for ink circulation may be alternately reversed as necessary.

In addition, as described above, the operation of applying and drying the pretreatment liquid may be omitted in the above-described example.

In this case, in the ink jet recording device according to the above-described example, the pretreatment liquid applying device Pl and the pretreatment liquid drying zone DP1 may be omitted.

Ink Applying Step

The recording method of the present disclosure includes an ink applying step.

The ink applying step is a step of circulating the ink in a circulation flow passage and jetting the ink from an ink jet head to apply the ink onto a recording medium.

An image is obtained by the ink jetted onto the recording medium.

(Recording Medium)

The recording medium is not particularly limited, and a known recording medium such as a paper base material or a resin base material can be used without particular limitation.

Examples of the paper base material include so-called coated paper used for general offset printing and the like. Examples of the coated paper include paper provided with a coating layer by coating a surface of high-quality paper, neutral paper, or the like, which contains cellulose as a main component and has not been typically subjected to a surface treatment, with a coating material.

The resin base material is not particularly limited, but a resin base material having a film shape (that is, a sheet shape) is preferable.

The thickness of the resin base material is preferably in a range of 12 μm to 200 μm, more preferably in a range of 12 μm to 100 μm, still more preferably in a range of 12 μm to 60 μm, and even still more preferably in a range of 15 μm to 60 μm.

The shape of the resin base material may be a long film shape (that is, a long sheet shape).

The length of the resin base material in a case where the resin base material has a long film shape is not particularly limited, but is preferably 5 m or greater, more preferably 10 m or greater, and still more preferably 100 m or greater.

The upper limit of the length of the resin base material in a case where the resin base material has a long film shape is not particularly limited, and may be, for example, 10000 m, 8000 m, or 5000 m.

Examples of the resin base material include a polyester base material, a polyethylene base material, a polypropylene base material, and a nylon base material.

The resin base material may be a stretched base material or an unstretched base material.

The resin base material may be an impermeable base material having transparency.

Here, the expression of "having transparency" denotes that the transmittance of visible light having a wavelength of 400 nm to 700 nm is 80% or greater (preferably 90% or greater).

In a case where the resin base material is a resin base material having transparency, an image is easily visually recognized through the resin base material from an image non-recording surface side of the resin base material.

For example, in a case where the resin base material is a resin base material having transparency and in a case where the pretreatment liquid, at least one colored ink, and a white ink as the ink according to the present disclosure are applied in this order onto the resin base material to record a multicolor image, a colored image (for example, a pattern image such as a character or a figure) having a white image (for example, a solid image) as a background is easily visually recognized through the resin base material from the image non-recording surface side of the resin base material.

The resin base material may be subjected to a surface treatment.

Examples of the surface treatment include a corona treatment, a plasma treatment, a flame treatment, a heat treatment, an abrasion treatment, a light irradiation treatment (UV treatment), and a flame treatment, but the surface treatment is not limited thereto.

(Circulation and Jetting of Ink)

The circulation and the jetting of the ink in the ink applying step are as described above.

(Ink)

The ink that is circulated and jetted in the ink applying step is an ink (for example, a white ink) containing water and a white pigment which is a titanium dioxide particle.

The number of white large particles which are particles having a particle diameter of 0.8 μm to 5 μm in the white pigment of the ink (that is, Pn in Equation (1)) is $1.00\times10^4$ pieces/$cm^3$ or greater. In other words, in the ink of the present disclosure, the number of white large particles per 1 $cm^3$ of the ink is $1.00\times10^4$ or greater.

The factor that the number of white large particles (that is, Pn in Equation (1)) is $1.00\times10^4$ pieces/$cm^3$ or greater contributes to the improvement of the covering property of the image to be recorded.

In the present disclosure, the covering property is one of the properties of the image and denotes a property of covering and concealing a base (for example, a recording medium or a colored image recorded on the recording medium) on which the image is recorded by the image.

In general, in a case where the number of white large particles is $1.00\times10^4$ pieces/$cm^3$ or greater, this is advantageous for the above-described covering property, but the white large particles are likely to be sedimented in the ink, and as a result, the color consistency during long-term run may be impaired.

However, according to the recording method of the present disclosure, in a case where the velocity ratio (1) is set to $5.0\times10^3$ or greater (schematically, the circulation flow rate is relatively increased with respect to the sedimentation velocity of the ink), the problem of sedimentation of white large particles can be solved, and as a result, the problem of color consistency during long-term run can be solved.

In the present disclosure, the number (that is, Pn in Equation (1)) of white large particles (that is, particles having a particle diameter of 0.8 μm to 5 μm in the white pigment) denotes a value measured using a particle size distribution meter.

In the examples described below, an injection type image analysis particle size distribution meter "IF-3200S" (manufactured by JASCO INTERNATIONAL CO., LTD.) of a wet dispersion type is used as the particle size distribution meter to measure the number of white large particles in an aqueous solution obtained by diluting the ink with water to 5000 times by volume, and the number of white large particles per 1 $cm^3$ of the ink (unit: pieces/$cm^3$) is obtained based on the obtained measured value.

Preferable aspects of the ink according to the present disclosure will be described below.

(Heating and Drying Ink)

The ink applying step may include heating and drying the ink applied onto the recording medium.

A method of heating and drying the ink is not particularly limited, and examples thereof include infrared (IR) drying, warm air drying, and heating and drying with a heating device (such as a heater, a hot plate, or a heating furnace).

A method of combining two or more of these methods may be used as the method of heating and drying the ink.

The heating and drying can be performed by heating the ink from at least one of the image recording surface side or the image non-recording surface side of the recording medium.

The heating temperature in the heating and drying of the ink is preferably in a range of 30° C. to 100° C., more preferably in a range of 35° C. to 90° C., and still more preferably in a range of 40° C. to 80° C.

The heating time in the heating and drying of the ink is not particularly limited, but is preferably in a range of 1 second to 180 seconds, more preferably in a range of 1 second to 120 seconds, and still more preferably in a range of 1 second to 60 seconds.

Velocity Ratio (1)

In the recording method of the present disclosure, the velocity ratio (1) defined by Equation (1) is $5.0\times10^3$ or greater and $1.4\times10^5$ or less.

$$\text{Velocity ratio (1)} = Vc/(Vslp \times \log(Pn)) \quad \text{Equation (1)}$$

$$Vslp = \{(\rho - \rho w)gR^2\}/(18\eta) \quad \text{Equation (A)}$$

In Equation (1), Vc represents a circulation flow rate of the ink in units of cm/s in a connecting portion between the circulation tube and the ink jet head, Vslp represents a sedimentation velocity of the white large particles in units of cm/s, which is defined by Equation (A), and Pn represents the number of the white large particles in the ink in units of pieces/$cm^3$.

In Equation (A), ρ represents 4.23, ρw represents a density of a solvent in the ink in units of g/$cm^3$, g represents an acceleration of gravity in units of cm/$s^2$, and R represents a median diameter of the white large particles in units of cm.

η represents a viscosity of the solvent in the ink at 30° C. in units of g/cm·s.

In Equation (1) defining the velocity ratio (1), "Vc" (circulation flow rate of the ink), which is a factor for improving the effect of the color consistency during long-term run, is disposed in the numerator, and "Vslp" (sedimentation velocity of white large particles) and "log (Pn)" (Pn represents the number of white large particles), which are factors for suppressing the color consistency during long-term run, are disposed in the denominator.

In a case where the velocity ratio (1) is $5.0\times10^3$ or greater, the effect of the color consistency during long-term run can be obtained.

Meanwhile, in a case where the velocity ratio (1) is $1.4\times10^5$ or less, the effect of jetting stability of the ink during long-term run can be obtained.

The velocity ratio (1) is preferably $1.0\times10^4$ or greater and $1.0\times10^5$ or less, more preferably $1.0\times10^4$ or greater and $9.3\times10^4$ or less, and still more preferably $1.0\times10^4$ or greater and $7.0\times10^4$ or less.

In Equation (1), Vc represents the circulation flow rate of the ink in units of cm/s in a connecting portion between the ink jet head and the circulation tube.

Vc is calculated based on the flow rate of the ink in the connecting portion and the cross-sectional area of the flow passage of the circulation tube in the connecting portion.

Vc is preferably in a range of 5 to 100 and more preferably in a range of 10 to 80.

In Equation (1), Pn represents the number of white large particles in the ink in units of pieces/$cm^3$. That is, Pn represents the number of white large particles per 1 $cm^3$ of the ink (that is, particles having a particle diameter of 0.8 μm to 5 μm in the white pigment).

A method of measuring Pn is as described above.

As described above, Pn is a value satisfying $1.00\times10^9$ pieces/$cm^3$ or greater.

It is preferable that Pn is a value in a range of $1.00\times10^9$ pieces/$cm^3$ or greater and $1.00\times10^{13}$ pieces/$cm^3$ or less.

In Equation (1), Vslp represents the sedimentation velocity of the white large particles defined by Equation (A) in units of cm/s.

Vslp is preferably $1.00\times10^{-6}$ or greater and $1.00\times10^{-3}$ or less.

Equation (A) defining Vslp is an equation based on Stokes' principle.

In Equation (A), ρ represents 4.23.

Here, "4.23" (=ρ) is the density of the rutile type titanium dioxide in units of g/$cm^3$.

In Equation (A), ρw represents the density of the solvent in the ink in units of g/$cm^3$.

Here, the solvent in the ink includes at least water.

In a case where the ink includes an organic solvent, the solvent in the ink includes water and an organic solvent.

ρw is measured by the following method.

The ink is subjected to centrifugal separation at an acceleration of 10000 G (note: 1 G=9.80665 m/$s^2$) for 60 minutes to separate the solvent from the ink, the mass and the volume of the obtained solvent are measured, and the density (ρw) of the solvent in units of g/$cm^3$ is determined from the obtained mass and volume.

In Equation (A), ρw is 0.70 or greater and 1.30 or less, preferably 0.80 or greater and 1.20 or less, and more preferably 0.90 or greater and 1.10 or less.

In Equation (A), R represents a median diameter (d50) of the white large particles in units of cm.

In the present disclosure, the median diameter (d50) of the white large particles (that is, the particles having a particle diameter of 0.8 μm to 5 μm in the white pigment) in units of cm is a value measured using a particle size distribution meter.

In the examples described below, an injection type image analysis particle size distribution meter "IF-3200S" (manufactured by JASCO INTERNATIONAL CO., LTD.) of a wet dispersion type is used as the particle size distribution meter to measure the median diameter (d50) of white large particles in units of cm in an aqueous solution obtained by diluting the ink with water to 5000 times by volume.

In Equation (A), R is preferably $1.00\times10^{-5}$ or greater and $1.00\times10^{-3}$ or less and more preferably $1.00\times10^{-4}$ or greater and $1.00\times10^{-3}$ or less.

In Equation (A), η represents the viscosity of the solvent in the ink at 30° C. in units of g/cm·s.

The viscosity denotes a value measured by an E-type viscometer.

In Equation (A), η is measured as follows.

The ink is subjected to centrifugal separation at an acceleration of 10000 G (note: 1 G=9.80665 m/$s^2$) for 60 minutes to separate the solvent from the ink, and the viscosity of the obtained solvent at 30° C. in units of g/cm·s is measured by an E-type viscometer.

In Equation (A), $\eta$ is preferably $1.00\times10^{-2}$ or greater and $1.00\times10^{-3}$ or less and more preferably $0.30\times10^{-2}$ or greater and $0.70\times10^{-2}$ or less.

Velocity Ratio (2)

In the recording method of the present disclosure, the velocity ratio (2) defined by Equation (2) is preferably $1.2\times10^{3}$ or greater and more preferably $1.5\times10^{3}$ or greater.

$$\text{Velocity ratio (2)=velocity ratio (1)}\times(1-\cos\theta) \quad \text{Equation (2)}$$

In Equation (2), $\theta$ represents the contact angle of the ink in units of ° with respect to the inner surface of the circulation tube that returns the ink to the ink jet head.

$\theta$ represents the contact angle (°) defined in a range of greater than 0 and less than 180, and it is advantageous that the value increases in this range in terms of the effect of the color consistency during long-term run.

That is, $(1-\cos\theta)$ is a factor that improves the effect of color consistency during long-term run.

In a case where the velocity ratio (2) is $1.2\times10^{3}$ or greater, the color consistency during long-term run is further improved.

$(1-\cos\theta)$ itself is not particularly limited.

$(1-\cos\theta)$ is, for example, 0.05 or greater and 0.60 or less and preferably 0.10 or greater and 0.20 or less.

From the viewpoint of further improving the color consistency during long-term run and further improving the jetting stability of the ink during long-term run, the velocity ratio (2) is preferably $1.2\times10^{3}$ or greater and $1.0\times10^{5}$ or less and more preferably $1.5\times10^{3}$ or greater and $8.0\times10^{4}$ or less.

In the present disclosure, $\theta$ is measured by cutting the connecting portion between the ink jet head and the circulation tube for returning an ink to the ink jet head with a cutter, stretching the cut connecting portion in a flat plate shape to prepare a sample for measuring the contact angle, and using the prepared sample for measuring the contact angle.

Specifically, the ink is added dropwise to the surface corresponding to the inner surface of the circulation tube in the sample for measuring the contact angle, and the contact angle of the ink with respect to the inner surface of the circulation tube is measured.

The contact angle is measured using a contact angle measuring device under the condition that the size of the ink droplet is 2 μL and the waiting time from landing to measurement is 1000 ms in an environment of 25° C. and 50 RH %.

Velocity Ratio (3)

In a case where the ink is circulated through the ink tank in the recording method according to the present disclosure, the velocity ratio (3) defined by Equation (3) is preferably 8.0 or greater and more preferably 10.0 or greater.

$$\text{Velocity ratio (3)} = \text{velocity ratio (1)}\times(1/L) \quad \text{Equation (3)}$$

In Equation (3), L represents the length (cm) of the circulation tube from the ink tank to the ink jet head (that is, the circulation tube for returning the ink to the ink jet head).

As the value of L increases, the effect of color consistency during long-term run is suppressed.

In Equation (3) that defines the velocity ratio (3), L is disposed in the denominator.

Therefore, as the value of the velocity ratio (3) increases, specifically, in a case where the velocity ratio (3) is 8.0 or greater, the effect of color consistency during long-term run is further improved.

From the viewpoint of further improving the effect of color consistency during long-term run, the velocity ratio (3) is more preferably 10.0 or greater.

From the viewpoint of further improving the color consistency during long-term run and further improving the jetting stability of the ink during long-term run, the velocity ratio (3) is preferably 8.0 or greater and 120.0 or less, more preferably 8.0 or greater and 100.0 or less, and still more preferably 8.0 or greater and 80.0 or less.

In Equation (3), L itself is not particularly limited.

L represents, for example, 200 or greater and 5000 or less, preferably 300 or greater and 3000 or less, more preferably 500 or greater and 2400 or less, and still more preferably 600 or greater and 2000 or less.

Preferable Aspects of Ink

The ink in the present disclosure contains water and a white pigment which is a titanium dioxide particle.

Hereinafter, preferable aspects of the ink in the present disclosure will be described.

(Water)

The ink contains water.

The content of water is preferably 10% by mass or greater, more preferably 20% by mass or greater, still more preferably 30% by mass or greater, and particularly preferably 50% by mass or greater with respect to the total amount of the ink.

The upper limit of the content of water is appropriately determined according to the content of other components, and is, for example, 99% by mass, preferably 95% by mass, and more preferably 90% by mass with respect to the total amount of the ink.

(Water-Soluble Organic Solvent)

The ink contains a water-soluble organic solvent.

In this manner, the jetting stability from the ink jet head is ensured.

The water-soluble organic solvent contained in the ink may be used alone or in combination of two or more kinds thereof.

In the present disclosure, the term "water-soluble" indicates a property that 1 g or greater of a substance is dissolved in 100 g of water at 25° C.

In the present disclosure, the term "water-insoluble" indicates a property that less than 1 g of a substance is dissolved in 100 g of water at 25° C.

The kind of the water-soluble organic solvent which can be contained in the ink is not limited, and examples thereof include a monoalcohol having 1 to 4 carbon atoms; a diol such as 1,3-propanediol, 1,3-butanediol, 1,4-butanediol, 2-butene-1,4-diol, 2-ethyl-1,3-hexanediol, 2-methyl-2,4-pentanediol, 1,2-octanediol, 1,2-hexanediol, 1,2-pentanediol, or 4-methyl-1,2-pentanediol; a triol such as glycerin, 1,2,6-hexanetriol, or trimethylolpropane; alkylene glycol such as ethylene glycol or propylene glycol; alkylene glycol monoalkyl ether such as ethylene glycol monoalkyl ether or propylene glycol monoalkyl ether; polyalkylene glycol such as diethylene glycol, triethylene glycol, tetraethylene glycol, pentaethylene glycol, dipropylene glycol, or polyoxyethylene polyoxypropylene glycol; polyalkylene glycol ether such as diethylene glycol monoalkyl ether, triethylene glycol monoalkyl ether, tripropylene glycol monoalkyl ether, or polyoxypropylene glyceryl ether; 2-pyrrolidone, and N-methyl-2-pyrrolidone.

From the viewpoint of the jetting stability, it is preferable that the water-soluble organic solvent in the ink includes at least one selected from the group consisting of alkylene glycol and alkylene glycol monoalkyl ether.

The content of the water-soluble organic solvent is preferably in a range of 10% by mass to 40% by mass and more preferably in a range of 15% by mass to 30% by mass with respect to the total amount of the ink.

(White Pigment)

The ink contains a white pigment which is a titanium dioxide particle.

The white pigment contains white large particles which are particles having a particle diameter of 0.8 μm to 5 μm.

The number (Pn) of white large particles is as described above.

It is preferable that the white pigment contains rutile type titanium dioxide.

The proportion of the rutile type titanium dioxide in the entirety of the white pigment is preferably 50% by mass or greater, more preferably 60% by mass or greater, and still more preferably 80% by mass or greater. The proportion of the rutile type titanium dioxide in the entirety of the white pigment may be 100% by mass or less than 100% by mass.

From the viewpoint of the covering property, the average primary particle diameter of the white pigment is preferably 150 nm or greater and more preferably 200 nm or greater. Further, from the viewpoint of the jettability of the ink, the average primary particle diameter of the white pigment is preferably 400 nm or less and more preferably 350 nm or less.

In the present disclosure, the average primary particle diameter of the white pigment is a value measured using a transmission electron microscope (TEM). Specifically, the average primary particle diameter of the white pigment is a value determined by selecting 50 optional particles of the white pigment present in a visual field observed by a TEM, measuring the primary particle diameters of 50 particles, and averaging the measured diameters. As the transmission electron microscope, a transmission electron microscope 1200EX (manufactured by JEOL Ltd.) can be used.

From the viewpoints of the image density and the jettability, the content of the white pigment in the ink is preferably in a range of 2% by mass to 25% by mass, more preferably in a range of 5% by mass to 25% by mass, and still more preferably in a range of 10% by mass to 20% by mass with respect to the total amount of the ink.

(Pigment Dispersing Resin)

The ink may contain at least one pigment dispersing resin.

In the present disclosure, the pigment dispersing resin is a resin having a function of dispersing a pigment.

The pigment dispersing resin may be a random copolymer or a block copolymer.

Further, the pigment dispersing resin may have a cross-linking structure.

The ink may be prepared using a pigment dispersion liquid containing a pigment and a pigment dispersing resin.

As the pigment dispersing resin, for example, known polymer dispersing agents such as polymer dispersing agents described in paragraphs 0029 to 0106 of WO2021/221069A can be used.

In a case where the ink contains the pigment dispersing resin, the ratio of the content of the pigment to the content of the pigment dispersing resin in the ink is preferably in a range of 1:0.04 to 1:3, more preferably in a range of 1:0.05 to 1:1, and still more preferably in a range of 1:0.05 to 1:0.5 on a mass basis.

In a case where the ink contains the pigment dispersing resin, the content of the pigment dispersing resin is preferably in a range of 0.1% by mass to 10% by mass, more preferably in a range of 0.3% by mass to 5% by mass, and still more preferably in a range of 0.5% by mass to 2.5% by mass with respect to the total amount of the ink.

(Resin Particles)

The ink may contain at least one kind of resin particles.

Examples of the resin particles that can be contained in the ink include the same resin particles that can be contained in the pretreatment liquid.

Here, the resin particles in the ink may be the same as or different from the resin particles in the pretreatment liquid.

In a case where the ink contains a resin, it is preferable that the ink contains at least one kind of resin particles.

It is preferable that the resin particles are at least one selected from the group consisting of acrylic resin particles, ester resin particles, a mixture of acrylic resin particles and ester resin particles, composite particles containing an acrylic resin and an ester resin, and polyurethane resin particles.

The content of the resin particles in the ink is preferably in a range of 1% by mass to 20% by mass, more preferably in a range of 2% by mass to 15% by mass, and still more preferably in a range of 2% by mass to 10% by mass with respect to the total amount of the ink.

(Additive)

The ink may contain additives such as a surfactant, a water-soluble resin, a co-sensitizer, an ultraviolet absorbing agent, an antioxidant, a fading inhibitor, a conductive salt, and a basic compound as necessary.

(Physical Properties)

From the viewpoint of improving the jetting stability, the pH (25° C.) of the ink is preferably in a range of 7 to 10 and more preferably in a range of 7.5 to 9.5. The pH of the colored ink can be measured by the same method as that for the pH of the pretreatment liquid.

The viscosity (25° C.) of the ink is preferably in a range of 0.5 mPa·s to 30 mPa·s, more preferably in a range of 2 mPa·s to 20 mPa·s, still more preferably in a range of 2 mPa·s to 15 mPa·s, and even still more preferably in a range of 3 mPa·s to 10 mPa·s. The viscosity of the ink can be measured by the same method as that for the viscosity of the pretreatment liquid.

The surface tension (25° C.) of the ink is preferably 60 mN/m or less, more preferably in a range of 20 mN/m to 50 mN/m, and still more preferably in a range of 30 mN/m to 45 mN/m.

The surface tension can be measured by the same method as that for the pretreatment liquid.

Colored Ink

In the recording method of the present disclosure, in a case where a white ink containing water and a white pigment is used as the ink of the present disclosure, a colored ink (for example, a black ink and/or a chromatic ink) may be used in addition to the white ink.

The colored ink may be applied to a side of the underlayer with respect to the white ink, a side of the upper layer with respect to the white ink, or a site different from a site to which the white ink is applied.

Pretreatment Liquid

In the recording method of the present disclosure, not only the ink but also a pretreatment liquid may be used as described above in the example.

It is preferable that the pretreatment liquid contains water and an aggregating agent.

(Water)

It is preferable that the pretreatment liquid contains water.

The content of water is preferably 50% by mass or greater and more preferably 60% by mass or greater with respect to the total amount of the pretreatment liquid.

The upper limit of the content of water depends on the amount of other components, but is preferably 90% by mass or less and more preferably 80% by mass or less with respect to the total amount of the pretreatment liquid.

(Aggregating Agent)

It is preferable that the pretreatment liquid contains at least one aggregating agent.

The aggregating agent in the pretreatment liquid aggregates the components in the ink on the recording medium. In this manner, the image quality of the image derived from the ink can be improved.

It is preferable that the aggregating agent is at least one selected from the group consisting of an organic acid, a polyvalent metal compound, a metal complex, and a cationic polymer.

Preferred examples of the aggregating agent also include the aggregating agents described in paragraphs 0122 to 0130 of WO2020/195360A.

Hereinafter, preferable aspects of each of the organic acid, the polyvalent metal compound, the metal complex, and the cationic polymer that can be used as the aggregating agent will be described.

Organic Acid

As the organic acid, an organic compound containing an acidic group is exemplified.

Examples of the acidic group include a phosphoric acid group, a phosphonic acid group, a phosphinic acid group, a sulfuric acid group, a sulfonic acid group, a sulfinic acid group, and a carboxy group.

Among these, from the viewpoint of the aggregation rate of the ink, a phosphoric acid group or a carboxy group is preferable, and a carboxy group is more preferable as the acidic group.

Further, it is preferable that at least a part of the acidic group is dissociated in the pretreatment liquid.

Examples of the organic compound containing a carboxy group include (meth)acrylic acid, poly(meth)acrylic acid, acetic acid, formic acid, benzoic acid, glycolic acid, malonic acid, malic acid (preferably DL-malic acid), maleic acid, succinic acid, glutaric acid, pimelic acid, adipic acid, fumaric acid, citric acid, tartaric acid, phthalic acid, 4-methylphthalic acid, lactic acid, pyrrolidone carboxylic acid, pyrone carboxylic acid, pyrrole carboxylic acid, furan carboxylic acid, pyridine carboxylic acid, coumaric acid, thiophene carboxylic acid, and nicotinic acid.

Among these, from the viewpoint of the aggregation rate of the ink, as the organic compound containing a carboxy group, di- or higher valent carboxylic acid (hereinafter, also referred to as polyvalent carboxylic acid) is preferable, and dicarboxylic acid is more preferable.

Specifically, as the polyvalent carboxylic acid, malonic acid, malic acid, maleic acid, succinic acid, glutaric acid, pimelic acid, adipic acid, fumaric acid, tartaric acid, 4-methylphthalic acid, or citric acid is preferable, and malonic acid, malic acid, tartaric acid, succinic acid, glutaric acid, pimelic acid, adipic acid, or citric acid is more preferable.

It is preferable that the organic acid has a low pKa (for example, 1.0 to 5.0). In this manner, the surface charge of particles such as resin particles or the pigment stably dispersed in the ink by a weakly acidic functional group such as a carboxy group can be reduced by bringing the ink into contact with an organic acid having a lower pKa to degrade the dispersion stability.

It is preferable that the organic acid has a low pKa, high solubility in water, and a valence of divalent or higher. Further, it is more preferable that the organic acid has a high buffer capacity in a pH region with a pKa lower than the pKa of a functional group (for example, a carboxy group) that stably disperses particles in the ink.

Polyvalent Metal Compound

Examples of the polyvalent metal compound include a polyvalent metal salt.

Examples of the polyvalent metal salt include an organic acid polyvalent metal salt and an inorganic acid polyvalent metal salt.

A polyvalent metal salt of the organic acid (for example, formic acid, acetic acid, or benzoic acid) described above is preferable as the organic acid polyvalent metal salt.

As the inorganic acid polyvalent metal salt, a nitric acid polyvalent metal salt, a hydrochloric acid polyvalent metal salt, or a thiocyanic acid polyvalent metal salt is preferable.

Examples of the polyvalent metal salt include salts of alkaline earth metals of a group 2 (such as magnesium and calcium) in the periodic table, salts of transition metals of a group 3 (such as lanthanum) in the periodic table, salts of metals of a group 13 (such as aluminum) in the periodic table, and salts of lanthanides (such as neodymium).

As the polyvalent metal salt, a calcium salt, a magnesium salt, or an aluminum salt is preferable, and a calcium salt or a magnesium salt is more preferable.

As the polyvalent metal compound, an organic acid polyvalent metal salt is preferable, and an organic acid calcium salt or an organic acid magnesium salt is more preferable.

Further, it is preferable that at least a part of the polyvalent metal compound is dissociated into polyvalent metal ions and counterions in the pretreatment liquid.

Metal Complex

It is preferable that the metal complex contains at least one selected from the group consisting of zirconium, aluminum, and titanium as a metal element.

As the metal complex, a metal complex including at least one selected from the group consisting of acetate, acetylacetonate, methylacetoacetate, ethylacetoacetate, octylene glycolate, butoxyacetylacetonate, lactate, a lactate ammonium salt, and triethanol aminate as a ligand is preferable.

The metal complex may be a commercially available product. Further, various organic ligands, particularly various multidentate ligands that are capable of forming metal chelate catalysts are commercially available. Accordingly, the metal complex may be a metal complex prepared by combining a commercially available organic ligand with a metal.

Cationic Polymer

It is preferable that the cationic polymer is a homopolymer of a cationic monomer containing a primary to tertiary amino group or a quaternary ammonium base, or a copolymer or a condensed polymer of a cationic monomer and a non-cationic monomer. The cationic polymer may be used in any form of a water-soluble polymer or a water-insoluble polymer (that is, latex particles).

Examples of the cationic polymer include a polyvinylpyridine salt, polyalkylaminoethyl acrylate, polyalkylaminoethyl methacrylate, polyvinylimidazole, polyethyleneimine, polybiguanide, polyguanide, polyallylamine, and derivatives thereof.

From the viewpoint of the viscosity of the pretreatment liquid, it is preferable that the weight-average molecular weight of the cationic polymer is small. In a case where the pretreatment liquid is applied to the resin base material by an ink jet recording system, the weight-average molecular weight thereof is preferably in a range of 1,000 to 500,000, more preferably in a range of 1,500 to 200,000, and still more preferably in a range of 2,000 to 100,000. It is advantageous that the weight-average molecular weight thereof is 1,000 or greater from the viewpoint of aggregation rate. It is advantageous that the weight-average molecular weight thereof is 500,000 or less from the viewpoint of jetting reliability. However, the weight-average molecular weight thereof is not limited thereto in a case where the pretreatment liquid is applied to the resin base material by a method other than the ink jet recording system.

The content of the aggregating agent in the pretreatment liquid is preferably in a range of 0.1% by mass to 40% by mass, more preferably in a range of 0.1% by mass to 30% by mass, still more preferably in a range of 1% by mass to 20% by mass, and even still more preferably in a range of 1% by mass to 10% by mass with respect to the total amount of the pretreatment liquid.

(Water-soluble Organic Solvent)

The pretreatment liquid may contain at least one water-soluble organic solvent.

Examples of the water-soluble organic solvent that can be contained in the pretreatment liquid include the same water-soluble organic solvents contained in the ink as described below.

Here, in this case, the water-soluble organic solvent in the pretreatment liquid may be the same as or different from the water-soluble organic solvent in the ink.

The content of the water-soluble organic solvent is preferably 20% by mass or less and more preferably 10% by mass or less with respect to the total amount of the pretreatment liquid.

The content of the water-soluble organic solvent may be 0% by mass. That is, the pretreatment liquid may contain no water-soluble organic solvent.

In a case where the pretreatment liquid contains a water-soluble organic solvent, the content of the water-soluble organic solvent is preferably in a range of 1% by mass to 20% by mass and more preferably in a range of 3% by mass to 10% by mass with respect to the total amount of the pretreatment liquid.

(Resin X)

The pretreatment liquid may contain at least one resin other than the cationic polymer (hereinafter, also referred to as "resin X").

Examples of the resin X include a polyester resin, a polyurethane resin, an acrylic resin, a polyamide resin, a polyurea resin, a polycarbonate resin, a polyolefin resin, and a polystyrene resin.

At least one of an acrylic resin, a polyester resin, or a polyurethane resin is preferable as the resin X.

In the present disclosure, the acrylic resin indicates a polymer (a homopolymer or a copolymer) of a raw material monomer containing at least one selected from the group consisting of acrylic acid, a derivative of acrylic acid (such as acrylic acid ester), methacrylic acid, and a derivative of methacrylic acid (such as methacrylic acid ester).

The weight-average molecular weight (Mw) of the resin X is preferably in a range of 1,000 to 300,000, more preferably in a range of 2,000 to 200,000, and still more preferably in a range of 5,000 to 100,000.

In the present disclosure, the weight-average molecular weight (Mw) indicates a value measured according to gel permeation chromatography (GPC) unless otherwise specified.

The measurement according to gel permeation chromatography (GPC) is performed using HLC (registered trademark)-8020GPC (manufactured by Tosoh Corporation) as a measuring device, three columns of TSKgel (registered trademark) Super Multipore HZ-H (manufactured by Tosoh Corporation, 4.6 mmID×15 cm), and tetrahydrofuran (THF) as an eluent. Further, the measurement is performed under measurement conditions of a sample concentration of 0.45% by mass, a flow rate of 0.35 ml/min, a sample injection volume of 10 μl, and a measurement temperature of 40° C. using an RI detector.

Further, the calibration curve is prepared using eight samples of "F-40", "F-20", "F-4", "F-1", "A-5000", "A-2500", "A-1000", and "n-propylbenzene" which are "Standard Samples TSK standard, polystyrene" (manufactured by Tosoh Corporation).

A form of resin particles is preferable as the form of the resin X in the pretreatment liquid.

That is, it is preferable that the pretreatment liquid contains resin particles as the resin X.

It is preferable that the resin X in this case is a water-insoluble resin.

The volume average particle diameter of the resin particles serving as the resin X is preferably in a range of 1 nm to 300 nm, more preferably in a range of 3 nm to 200 nm, and still more preferably in a range of 5 nm to 150 nm.

In the present disclosure, the volume average particle diameter indicates a value measured using a laser diffraction scattering type particle size distribution analyzer.

As a measuring device, a particle size distribution measuring device "MICROTRAC MT-3300II" (manufactured by Nikkiso Co., Ltd.) is exemplified.

Preferred examples of the resin particles serving as the resin X include acrylic resin particles, ester resin particles, a mixture of acrylic resin particles and ester resin particles, composite particles containing an acrylic resin and an ester resin, and polyurethane resin particles.

The content of the resin X in the pretreatment liquid is not particularly limited.

The content of the resin X is preferably in a range of 0.5% by mass to 30% by mass, more preferably in a range of 1% by mass to 20% by mass, and particularly preferably in a range of 1% by mass to 15% by mass with respect to the total amount of the pretreatment liquid.

(Surfactant)

The pretreatment liquid may contain at least one surfactant.

The kind of the surfactant is not particularly limited, and may be any of an anionic surfactant, a cationic surfactant, a betaine-based surfactant, or a nonionic surfactant. Further, examples of the surfactant include an acrylic surfactant, a fluorine-based surfactant, and a silicone-based surfactant.

The content of the surfactant is preferably in a range of 0.1% by mass to 5% by mass and more preferably in a range of 0.2% by mass to 1% by mass with respect to the total amount of the pretreatment liquid.

(Other Components)

The pretreatment liquid may contain other components as necessary in addition to the above-described components.

Examples of other components that can be contained in the pretreatment liquid include known additives such as a solid wetting agent, colloidal silica, an inorganic salt, a fading inhibitor, an emulsification stabilizer, a penetration enhancer, an ultraviolet absorbing agent, a preservative, a fungicide, a pH adjuster, a viscosity adjuster, a rust inhibitor, a chelating agent, and a water-soluble polymer compound (for example, water-soluble polymer compounds described in paragraphs 0026 to 0080 of JP2013-001854A).

(Physical Properties)

The pH of the pretreatment liquid is preferably in a range of 2.0 to 7.0 and more preferably in a range of 2.0 to 4.0. The pH is measured at 25° C. using a pH meter, for example, a pH meter (model number "HM-31", manufactured by DKK-TOA CORPORATION).

From the viewpoint of the coating properties of the pretreatment liquid, the viscosity of the pretreatment liquid is preferably in a range of 0.5 mPa·s to 10 mPa·s and more preferably in a range of 1 mPa·s to 5 mPa·s. The viscosity is a value measured at 25° C. using a viscometer. The viscosity is measured at 25° C. using a viscometer, for example, a TV-22 type viscometer (manufactured by Toki Sangyo Co., Ltd.).

The surface tension of the pretreatment liquid is preferably 60 mN/m or less, more preferably in a range of 20 mN/m to 50 mN/m, and still more preferably in a range of 30 mN/m to 45 mN/m. The surface tension is a value measured at a temperature of 25° C. The surface tension is measured at 25° C. by a plate method using a surface tension meter, for example, an automatic surface tension meter (product name, "CBVP-Z", manufactured by Kyowa Interface Science Co., Ltd.).

EXAMPLES

Hereinafter, the present disclosure will be described in more detail based on examples, but the present disclosure is not limited to the following examples unless the gist thereof is overstepped.

Examples 1 to 9 and Comparative Examples 1 to 6

<Preparation of Pretreatment Liquid>

The components described below were mixed to prepare a pretreatment liquid.

Composition of Pretreatment Liquid

- Glutaric acid [aggregating agent]: 6.1% by mass
- Propylene glycol (PG) [water-soluble organic solvent]: 20% by mass
- OLFINE E1010 (manufactured by Nissin Chemical Industry Co., Ltd.) [surfactant]: 0.5% by mass
- SUPERFLEX 500M (manufactured by DKS Co., Ltd.) [aqueous dispersion of urethane resin particles]: 7.0% by mass
- Triisopropanolamine [pH adjuster]: 0.2% by mass
- BYK024 (manufactured by BYK-Chemie GmbH) [anti-foaming agent]: 0.01% by mass
- Ultrapure water: remaining amount set such that total amount of pretreatment liquid reached 100% by mass <Synthesis of Pigment Dispersing Agent P1>

965 g of dipropylene glycol was added to a 5000 mL three-neck flask provided with a stirrer and a cooling pipe and heated to 85° C. in a nitrogen atmosphere.

A solution I obtained by dissolving 640 g of benzyl methacrylate, 340 g of methacrylic acid, and 19.94 g of 2-mercaptopropionic acid in 370.28 g of dipropylene glycol and a solution II obtained by dissolving 17.69 g of t-butyl peroxy-2-ethylhexanoate (product name "PERBUTYL O", manufactured by NOF Corporation) in 221.17 g of dipropylene glycol were respectively prepared. The solution I was added dropwise to the three-neck flask over 4 hours, and the solution II was added dropwise thereto over 5 hours.

After completion of the dropwise addition, the solution was allowed to further react for 2 hours. The disappearance of the monomers was confirmed by $^{1}$H-NMR.

The obtained reaction solution was heated to 70° C., 248.02 g of a 50 mass % potassium hydroxide aqueous solution was added thereto, 107.48 g of dipropylene glycol and 75.52 g of pure water were added thereto, and the solution was stirred, thereby obtaining a 37 mass % solution of a random polymer. This random polymer was defined as a pigment dispersing agent P1.

The structural units constituting the obtained random polymer were confirmed by $^{1}$H-NMR. In addition, the weight-average molecular weight (Mw) was acquired by GPC. The weight-average molecular weight (Mw) of the obtained pigment dispersing agent P1 was 8400, and the acid value thereof was 221.7 mgKOH/g.

<Preparation of White Pigment Dispersion Liquid (A)>

The pigment dispersing agent P1 (150 parts by mass) was dissolved in water to prepare a polymer solution in which the concentration of the pigment dispersing agent P1 was 25% by mass.

96 parts by mass of the polymer solution, 300 parts by mass of C.I. Pigment White 6 (trade name, "JR-405", manufactured by Tayca Co., Ltd., rutile type titanium dioxide particles) as a white pigment, and 270 parts by mass of water were mixed to obtain a mixed solution. A potassium hydroxide aqueous solution was added to the obtained mixed solution, and the pH after neutralization was adjusted to 8.7.

Next, the mixed solution after neutralization was subjected to a dispersion treatment for 3 hours using a beads mill (bead diameter: 0.1 mmφ, zirconia beads). In this manner, a white pigment dispersion liquid (uncrosslinked dispersion liquid) PD1 in which the white pigment was dispersed by the pigment dispersing agent P1 was obtained.

Next, ultrafiltration was performed by allowing ion exchange water to flow through the obtained white pigment dispersion liquid (uncrosslinked dispersion liquid) PD1 at a flow rate of 600 mL per minute using an ultrafiltration device (cross-flow type ultrafilter (UF), manufactured by Sartorius AG). The liquid temperature was maintained at 25° C., and the ultrafiltration was performed three times by setting one time the volume of the charged liquid to once. Ion exchange water was added to the liquid after the ultrafiltration, thereby obtaining a dispersion liquid after ultrafiltration in which the concentration of the white pigment was 45% by mass and the concentration of the pigment dispersing agent PI was 3.6% by mass.

1.35 parts by mass of trimethylolpropane polyglycidyl ether (product name, "Denacol EX-321", manufactured by Nagase ChemteX Corporation) as a crosslinking agent and 14.5 parts by mass of a boric acid aqueous solution (concentration of boric acid: 4% by mass) were added to 136 parts by mass of the dispersion liquid after ultrafiltration, and the mixture was allowed to react at 70° C. for 6 hours and cooled to 25° C. In this manner, the pigment dispersing agent P1 in the dispersion liquid was crosslinked to form a pigment dispersing agent P1*a* serving as a crosslinked polymer dispersing agent, thereby obtaining a white pigment dispersion liquid (crosslinked dispersion liquid) in which the white pigment was dispersed by the pigment dispersing agent P1*a*.

Ion exchange water was added to the obtained crosslinked dispersion liquid such that the concentration of the pigment was set to 15% by mass. Ultrafiltration was performed by allowing the crosslinked dispersion liquid to which ion exchange water had been added to flow into an ultrafiltration device (cross-flow type ultrafilter (UF), manufactured by Sartorius AG) provided with a polyether sulfone (PESU) film (size of micropores: 0.1 μm) at a flow rate of 600 mL per minute. At this time, the liquid temperature was adjusted to 25° C., and the ultrafiltration was performed three times by setting 1 time the volume magnification of the charged liquid as once. Next, ion exchange water was added such that the concentration of the white pigment was set to 45% by mass. In this manner, a white pigment dispersion liquid (A) was obtained.

The acid value of the pigment dispersing agent P1*a* contained in the white pigment dispersion liquid (A) was 144 mgKOH/g. Further, the concentration of the pigment dispersing agent P1*a* was 3.6% by mass.

<Preparation of White Pigment Dispersion Liquid (B)>

A white pigment dispersion liquid (B) was obtained in the same manner as in the preparation of the white pigment dispersion liquid (A) except that the bead diameter in the beads mill was changed to 0.3 mmφ.

<Preparation of White Ink>

Inks W1 to W6, which were white inks, were respectively prepared in the following manner.

(Preparation of Ink W1)

The white pigment dispersion liquid (A) was filtered through a filter (5EC4888389005J) having a length of 1 inch and 0.5 μm (manufactured by Nihon Pall Co., Ltd.), and the white pigment dispersion liquid (A) after the filtration and other components shown below were mixed with each other. The obtained mixture was filtered through the above-described filter (5EC4888389005J) to obtain an ink W1.

Composition of Ink W1

- White pigment dispersion liquid (A): 10.0% by mass in terms of content of white pigment
- Propylene glycol (PG) [water-soluble organic solvent]: 25.0% by mass
- Propylene glycol monomethyl ether (PGmME) [water-soluble organic solvent]: 2.0% by mass
- NeoCryl A-1105 (manufactured by DSM) [acrylic resin particle dispersion liquid]: 5.0% by mass in terms of content of resin particles
- OLFINE E1010 (manufactured by Nissin Chemical Co., Ltd.) [acetylene glycol-based surfactant]: 1.0% by mass
- BYK3450 (manufactured by BYK-Chemie GmbH) [silicone-based surfactant]: 0.1% by mass
- PVPK15 (polyvinylpyrrolidone K15): 0.15% by mass
- ST-XS (manufactured by Nissan Chemical Corporation) [colloidal silica dispersion liquid]: 0.05% by mass in terms of content of colloidal silica particles
- Water: remaining amount such that total amount of ink reached 100% by mass <Preparation of Ink W2>

An ink W2 was obtained in the same manner as in the preparation of the ink W1 except that the white pigment dispersion liquid (A) was changed to the same mass of a white pigment dispersion liquid (B).

<Preparation of Ink W3>

An ink W3 was obtained in the same manner as in the preparation of the ink W1 except that the amount of BYK3450 (0.1% by mass) was changed to 1.5% by mass.

<Preparation of Ink W4>

An ink W4 was obtained in the same manner as in the preparation of the ink W1 except that the filter (5EC4888389005J) having a length of 1 inch and 0.5 μm (manufactured by Nihon Pall Co., Ltd.) used for each of the filtration of the white pigment dispersion liquid and the filtration of the mixture was changed to a filter (5EC4888389010J) having a length of 1 inch and 1.0 μm (manufactured by Nihon Pall Co., Ltd.).

<Preparation of Ink W5>

An ink W5 was obtained in the same manner as in the preparation of the ink W4 except that the amount of propylene glycol (PG) (25.0% by mass) was changed to 20.0% by mass, the amount of propylene glycol monomethyl ether (PGmME) (2.0% by mass) was changed to 5.0% by mass, and propylene glycol monopropyl ether (PGmPE) [water-soluble organic solvent] (2.0% by mass) was further added.

<Preparation of Ink W6>

After the preparation of the ink W1 (that is, after the filtration of the mixture through 5EC4888389005J), the obtained ink W1 was further filtered with 5EC4888389005J, thereby obtaining an ink W6.

<Preparation of Base Material>

A polyethylene terephthalate (PET) base material "FE2001 (thickness: 23 μm)" (manufactured by FUTAMURA CHEMICAL CO., LTD.) was prepared as a base material (that is, a recording medium).

Here, "FE2001 (thickness: 23 μm)" is a roll body in which a PET base material with a thickness of 23 μm, a width of 580 mm, and a length of 4000 m is wound in a roll shape.

<Preparation of Ink Jet Recording Device>

In the ink jet recording device shown in FIG. 1, an ink jet recording device having a structure in which six ink jet heads IJ1 were arranged in the transport direction of the recording medium was prepared as an ink jet recording device.

A gravure coater was used as the pretreatment liquid applying device P1.

The drying method in the pretreatment liquid drying zone DP1 was drying with warm air.

One end of the circulation tube C1 and one end of the circulation tube C2 were connected to each of the six ink jet heads IJ1. The other end of the circulation tube C1 and the other end of the circulation tube C2 were connected to the ink tank IT1 corresponding to each color of ink.

Although not shown, a degassing module for degassing an ink, a liquid feeding pump for feeding an ink, a filter for removing foreign matter, a heat exchanger for adjusting the temperature of an ink, and a flowmeter for measuring the flow rate of an ink were disposed in this order from the ink tank IT1 side in the middle of each circulation tube C2.

Although not shown, a liquid feeding pump for feeding an ink and a filter for removing foreign matter were disposed in this order from the ink jet head IJ1 side in the middle of each circulation tube C1.

The circulation tubes listed in Tables 1 and 2 were used as the circulation tubes C1 and C2.

Each of the circulation tubes listed in Tables 1 and 2 is as follows.

- LDPE1: Low-density polyethylene tube ("6-608-6" manufactured by AS ONE Corporation, inner diameter: 0.6 cm)

LDPE2: low-density polyethylene tube ("6-608-10" manufactured by AS ONE Corporation, inner diameter: 1.0 cm)

LDPE 3: low-density polyethylene tube ("6-608-4" manufactured by AS ONE Corporation, inner diameter: 0.4 cm)

LDPE4: low-density polyethylene tube ("6-608-15" manufactured by AS ONE Corporation., inner diameter: 2.1 cm)

Tygon: Tygon tube ("Tygon 2001" manufactured by Saint-Gobain S.A.)

PP: polypropylene tube ("5-5666-44" manufactured by AS ONE Corporation, inner diameter: 0.6 cm)

The length L of the circulation tube C2 from the ink tank to the ink jet head was adjusted to the length listed in Table 1 ("length L of circulation tube C2 between tank and head").

Hereinafter, the six ink jet heads IJ1 may be referred to as a first head, a second head, a third head, a fourth head, a fifth head, and a sixth head in order from the ink jet head on the upstream side. In addition, each of the six ink jet heads IJ1 may be referred to as a head.

As each head, 1200 dpi/20 inch-width piezo full line head was used. Here, dpi is an abbreviation for dot per inch.

Each of the heads is a line head in which nozzles are arranged in a direction (that is, the width direction of the base material) orthogonal to the transport direction of the base material.

As each of the heads, Samba G3L (manufactured by FUJIFILM DIMATIX) was used.

<Ink Jet Recording>

The base material was subjected to a surface treatment by performing corona discharge on the base material under conditions of a discharge gap of 1 mm, 100 W, and 4 m/min using a corona treatment machine (corona surface modification evaluation device TEC-4AX, manufactured by KASUGA DENKI, INC.).

The base material after the surface treatment, the pretreatment liquid, and the white ink (that is, any one of the inks W1 to W6, see Tables 1 and 2 for details) were set on the image recording device.

The white ink was set to be jetted from the fifth head.

The pretreatment liquid was applied onto the base material using a wire bar coater while the base material was allowed to move at a constant speed of 50 m/min.

The mass of the pretreatment liquid applied was set to 1.5 $g/m^2$.

Here, the mass of the pretreatment liquid applied is a value obtained by dividing the mass of the applied pretreatment liquid by the area of the region where the pretreatment liquid was applied.

The pretreatment liquid started drying with a dryer 2 seconds after the completion of the application of the pretreatment liquid to a site where the application of the pretreatment liquid was completed, and the pretreatment liquid was dried. The pretreatment liquid was dried under conditions of 60° C. for 3 seconds.

Next, the white ink (that is, any one of the inks W1 to W6, see Table 1 and Table 2 for details) was jetted from the fifth head and applied in the form of a solid image onto the surface of the base material onto which the pretreatment liquid had been applied while the base material was moved at a constant speed at a rate of 50 m/min. In this case, the droplet amount of the ink was set to 3.4 ng, the duty ratio was set to 100%, and the jetting frequency was set to 39.37 kHz.

The white ink was jetted while circulating in a path of the ink tank IT1→the circulation tube C2→the ink jet head IJ1→the circulation tube C1→the ink tank IT1 as shown in FIG. 1 by operating a liquid feeding pump (not shown) provided in the middle of the circulation tube C1 and a liquid feeding pump (not shown) provided in the middle of the circulation tube C2. In this case, the ink circulation flow rate (mL/s) was adjusted to a value listed in Table 1 and Table 2, and in this manner, the ink circulation velocity Vc in the circulation tube (specifically, the connecting portion with the ink jet head) was adjusted to a value listed in Table 1 and Table 2.

In addition, the white ink was degassed by a degassing module (not shown) provided in the middle of the circulation tube C2, passed through a filter (not shown), temperature-adjusted to 30° C. by a heat exchanger for adjusting the temperature of an ink (not shown) provided in the middle of the circulation tube C2, and jetted onto the base material.

Next, the white ink applied onto the base material was dried with infrared (IR) rays using an infrared (IR) irradiation device (PLC-328, manufactured by Noritake Co., Ltd.) 2 seconds after completion of the ink application of the ink under the condition that the surface temperature of the ink was 75° C., and dried with warm air at 80° C. for 20 seconds using a dryer, thereby obtaining a white ink solid image.

As described above, an image recorded material including a base material and a white ink solid image provided on the base material was obtained.

<Contact Angle θ of Ink With Respect to Inner Surface of Circulation Tube>

The circulation tube C2 was cut with a cutter and stretched in a flat plate shape to prepare a sample for measuring the contact angle.

The corresponding white ink was added dropwise to the surface corresponding to the inner surface of the circulation tube in the sample for measuring the contact angle, and the contact angle of the ink with respect to the inner surface of the circulation tube was measured.

The contact angle was measured by a method of the related art using a contact angle measuring device (DM-500, manufactured by Kyowa Interface Science Co., Ltd.) in an environment of 25° C. and 50 RH % (the size of the ink droplet was 2 μL, and the waiting time from landing to measurement was 1000 ms).

The obtained contact angle θ (°) and "1−cos θ" are listed in Tables 1 and 2.

<Velocity Ratio (1), Velocity Ratio (2), and Velocity Ratio (3)>

The velocity ratio (1), the velocity ratio (2), and the velocity ratio (3) were determined based on Equations (1), (2), and (3).

The results are listed in Table 1 and Table 2.

<Evaluation>

The following evaluations were performed by carrying out ink jet recording described above.

The results are listed in Table 1 and Table 2.

(Color Consistency During Long-Term Run)

Ink jet recording at a rate of 50 m/min was continuously performed for 60 minutes to obtain an image recorded material. In the obtained image recorded material, the opacity (covering power) for every length of 1000 m was measured.

The covering power was measured using x-rite exact Advanced (manufactured by X-Rite, Incorporated) according to the following procedure (see https://www.xrite.co.jp/allproduct/q-a/99-exact/588-pqa0111.html).

First, the image recorded material was placed on a black portion of a covering ratio test paper (JIS qualified product, manufactured by TP Tech Co., Ltd.) in an orientation in which the image in the image recorded material was in contact with the black portion, and the covering power was measured.

Next, the image recorded material in which the covering power on the black portion was measured was placed on the white portion of the covering ratio test paper in an orientation in which the image in the image recorded material was in contact with the white portion, and the covering power at the same place as the place where the covering power on the black portion was measured was measured.

The obtained covering powers for every length of 1000 m (specifically, the covering power at a site with a length of 1000 m from the site where image recording was started, the covering power at a site with a length of 2000 m from the site where image recording was started, and the covering power at a site with a length of 3000 m from the site where image recording was started) were compared with each other, and the color consistency was evaluated.

The evaluation standards are as follows.

In the following evaluation standards, the rank of the most excellent color consistency during long-term run is A.

Evaluation Standards for Color Consistency During Long-Term Run

- A: The standard deviation of the covering power was 0.6% or less.
- B: The standard deviation of the covering power was greater than 0.6% and 0.9% or less.
- C: The standard deviation of the covering power was greater than 0.9% and 1.5% or less.
- D: The standard deviation of the covering power was greater than 1.5%.

(Covering Property of Image)

The covering property of the image was evaluated according to the following evaluation standards based on the covering power at the site with a length of 1000 m from the site where image recording was started in the evaluation of the color consistency during long-term run.

In the following evaluation standards, the rank of the most excellent covering property of the image is AA.

Evaluation Standards for Covering Property of Image

- AA: The covering power was 58% or greater.
- A: The covering power was 57% or greater and less than 58%.

- B: The covering power was 56% or greater and less than 55%.
- C: The covering power was 55% or greater and less than 54%.
- D: The covering power was 54% or less.

(Jetting Stability During Long-Term Run)

The image recorded material obtained in the evaluation of the color consistency during long-term run was placed on the black portion of the above-described covering ratio test paper in an orientation in which the image in the image recorded material was in contact with the black portion, and the presence or absence of streaks in the image due to the jetting failure of the ink was observed.

Specifically, the number of streaks at the site where image recording was started and the number of streaks at the site with a length of 3000 m from the site where image recording was started were compared with each other, and the jetting stability during long-term run was evaluated according to the following evaluation standards.

In the following evaluation standards, the rank of the most excellent jetting stability during long-term run is A.

Evaluation Standards for Jetting Stability During Long-Term Run

- A: The rate of an increase in number of streaks at the site with a length of 3000 m from the site where image recording was started to the number of streaks at the site where the image recording was started was 10% or less.
- B: The rate of an increase in number of streaks at the site with a length of 3000 m from the site where image recording was started to the number of streaks at the site where the image recording was started was greater than 10% and 50% or less.
- C: The rate of an increase in number of streaks at the site with a length of 3000 m from the site where image recording was started to the number of streaks at the site where the image recording was started was greater than 50% and 100% or less.
- D: The rate of an increase in number of streaks at the site with a length of 3000 m from the site where image recording was started to the number of streaks at the site where the image recording was started was greater than 100%.

TABLE 1

| | Example 1 | Example 2 | Example 3 | Example 4 | Example 5 | Example 6 | Example 7 | Example 8 | Example 9 |
|---|---|---|---|---|---|---|---|---|---|
| ρ | 4.23 | 4.23 | 4.23 | 4.23 | 4.23 | 4.23 | 4.23 | 4.23 | 4.23 |
| ρw: density of solvent (g/cm$^3$) | 1.01 | 1.01 | 1.01 | 1.01 | 1.01 | 1.01 | 1.01 | 1.01 | 1.01 |
| R: median diameter (cm) of white large particles | 1.64E−04 | 1.64E−04 | 1.64E−04 | 1.76E−04 | 1.76E−04 | 1.76E−04 | 1.64E−04 | 1.64E−04 | 2.49E−04 |
| η: viscosity (g/cm · s) of solvent (at 30° C.) | 5.03E−02 | 5.03E−02 | 5.03E−02 | 5.34E−02 | 5.34E−02 | 5.34E−02 | 5.03E−02 | 5.03E−02 | 4.91E−02 |
| Vslp (Equation (A)): sedimentation velocity (cm/s) of white large particles | 9.37E−05 | 9.37E−05 | 9.37E−05 | 1.02E−04 | 1.02E−04 | 1.02E−04 | 9.37E−05 | 9.37E−05 | 2.20E−04 |
| Ink No. | W1 | W1 | W1 | W3 | W3 | W3 | W1 | W1 | W2 |
| Pn: number (pieces/cm$^3$) of white large particles | 1.23E+09 | 1.23E+09 | 1.23E+09 | 3.65E+09 | 3.65E+09 | 3.65E+09 | 1.23E+09 | 1.23E+09 | 5.62E+12 |
| log (Pn) | 9.1 | 9.1 | 9.1 | 9.6 | 9.6 | 9.6 | 9.1 | 9.1 | 12.7 |
| Ink circulation flow rate (mL/s) | 10 | 10 | 10 | 10 | 10 | 15 | 15 | 10 | 8 |

TABLE 1-continued

| | Example 1 | Example 2 | Example 3 | Example 4 | Example 5 | Example 6 | Example 7 | Example 8 | Example 9 |
|---|---|---|---|---|---|---|---|---|---|
| Type of circulation tube | LDPE1 | LDPE2 | Tygon | Tygon | LDPE2 | LDPE2 | PP | LDPE3 | LDPE1 |
| θ: contact angle (°) of ink with respect to inner surface of circulation tube | 32 | 32 | 62.9 | 48.6 | 24.3 | 24.3 | 48.2 | 32 | 32 |
| Inner diameter (cm) of circulation tube | 0.6 | 1.0 | 0.6 | 0.6 | 1.0 | 1.0 | 0.6 | 0.4 | 0.6 |
| Cross-sectional area ($cm^2$) of flow passage in circulation tube | 0.28 | 0.79 | 0.28 | 0.28 | 0.79 | 0.79 | 0.28 | 0.13 | 0.28 |
| Vc: ink circulation velocity (cm/s) in circulation tube | 35 | 13 | 35 | 35 | 13 | 19 | 53 | 80 | 28 |
| 1 − cosθ | 0.15 | 0.15 | 0.54 | 0.34 | 0.09 | 0.09 | 0.33 | 0.15 | 0.15 |
| L: length (cm) of circulation tube C2 between tank and head | 800 | 800 | 800 | 800 | 800 | 2400 | 800 | 800 | 800 |
| Velocity ratio (1) = Vc/(Vslp × log (Pn)) | 4.2E+04 | 1.5E+04 | 4.2E+04 | 3.6E+04 | 1.3E+04 | 2.0E+04 | 6.2E+04 | 9.3E+04 | 1.0E+04 |
| Velocity ratio (2) = velocity ratio (1) × (1 − cosθ) | 6.3E+03 | 2.3E+03 | 2.3E+04 | 1.2E+04 | 1.2E+03 | 1.7E+03 | 2.1E+04 | 1.4E+04 | 1.5E+03 |
| Velocity ratio (3) = velocity ratio (1) × (1/L) | 51.9 | 18.7 | 51.9 | 45.5 | 16.4 | 8.2 | 77.8 | 116.8 | 12.6 |
| Color consistency during long-term run | A | B | A | A | C | C | A | A | B |
| Covering property | A | A | C | AA | AA | AA | AA | A | AA |
| Jetting stability during long-term run | A | A | A | A | A | A | A | B | A |

TABLE 2

| | Comparative Example 1 | Comparative Example 2 | Comparative Example 3 | Comparative Example 4 | Comparative Example 5 | Comparative Example 6 |
|---|---|---|---|---|---|---|
| ρ | 4.23 | 4.23 | 4.23 | 4.23 | 4.23 | 4.23 |
| ρw: density of solvent ($g/cm^3$) | 1.01 | 1.01 | 1.01 | 1.01 | 1.01 | 1.01 |
| R: median diameter (cm) of white large particles | 1.64E−04 | 1.64E−04 | 2.02E−04 | 2.66E−04 | 1.64E−04 | 1.34E−04 |
| η: viscosity (g/cm · s) of solvent (at 30° C.) | 5.03E−02 | 5.03E−02 | 5.12E−02 | 5.69E−02 | 5.03E−02 | 4.97E−02 |
| Vslp (Equation (A)): sedimentation velocity (cm/s) of white large particles | 9.37E−05 | 9.37E−05 | 1.40E−04 | 2.18E−04 | 9.37E−05 | 6.29E−05 |
| Ink No. | W1 | W1 | W4 | W5 | W1 | W6 |
| Pn: number ($pieces/cm^3$) of white large particles | 1.23E+09 | 1.23E+09 | 2.57E+09 | 3.40E+12 | 1.23E+09 | 5.00E+03 |
| log (Pn) | 9.1 | 9.1 | 9.4 | 12.5 | 9.1 | 3.7 |
| Ink circulation flow rate (mL/s) | 10 | 20 | 20 | 10 | 16 | 10 |
| Type of circulation tube | LDPE4 | LDPE3 | LDPE4 | LDPE2 | LDPE3 | Tygon |
| θ: contact angle (°) of ink with respect to inner surface of circulation tube | 32 | 32 | 32 | 17.9 | 32 | 62.9 |
| Inner diameter (cm) of circulation tube | 2.1 | 0.4 | 2.1 | 1.0 | 0.4 | 0.4 |
| Cross-sectional area ($cm^2$) of flow passage in circulation tube | 3.46 | 0.13 | 3.46 | 0.79 | 0.13 | 0.13 |
| Vc: ink circulation velocity (cm/s) in circulation tube | 3 | 159 | 6 | 13 | 127 | 80 |
| 1 − cosθ | 0.15 | 0.15 | 0.15 | 0.05 | 0.15 | 0.54 |
| L: length (cm) of circulation tube C2 between tank and head | 800 | 800 | 1800 | 1800 | 800 | 800 |
| Velocity ratio (1) = Vc/(Vslp × log (Pn)) | 3.4E+03 | 1.9E+05 | 4.4E+03 | 4.7E+03 | 1.5E+05 | 3.4E+05 |
| Velocity ratio (2) = velocity ratio (1) × (1 − cosθ) | 5.1E+02 | 2.8E+04 | 6.7E+02 | 2.3E+02 | 2.3E+04 | 1.9E+05 |

TABLE 2-continued

| | Comparative Example 1 | Comparative Example 2 | Comparative Example 3 | Comparative Example 4 | Comparative Example 5 | Comparative Example 6 |
|---|---|---|---|---|---|---|
| Velocity ratio (3) = velocity ratio (1) × (1/L) | 4.2 | 233.5 | 2.4 | 2.6 | 186.8 | 427.8 |
| Color consistency during long-term run | D | A | D | D | A | A |
| Covering property | A | A | A | AA | A | D |
| Jetting stability during long-term run | A | D | A | A | D | D |

In Table 1 and Table 2, "aEb" denotes $a\times10^{b}$. For example, "1.64E–04" and "1.23E+09" respectively denote $1.64\times10^{4}$ and $1.23\times10^{9}$.

As listed in Table 1 and Table 2, in Examples 1 to 9 in which the number Pn of white large particles was $1.00\times10^{4}$ pieces/cm$^3$ or greater and the velocity ratio (1) was $5.0\times10^{3}$ or greater and $1.4\times10^{5}$ or less, the color consistency during long-term run and the jetting stability during long-term run were excellent.

The results of the comparative examples are as follows with respect to the above-described examples.

In Comparative Examples 1, 3, and 4 in which the velocity ratio (1) was less than $5.0\times10^{3}$, the color consistency during long-term run was degraded.

In Comparative Examples 2, 5, and 6 in which the velocity ratio (1) was greater than $1.4\times10^{5}$, the jetting stability during long-term run was degraded.

In Comparative Example 6 in which the number Pn of white large particles was less than $1.00\times10^{4}$ pieces/cm$^3$, the covering property of the image was also degraded.

As shown in the results of Examples 5 and 9, it was found that the color consistency during long-term run was further improved in a case where the velocity ratio (2) was $1.5\times10^{3}$ or greater (Example 9).

As shown in the results of Examples 6 and 9, it was found that the color consistency during long-term run was further improved in a case where the velocity ratio (3) was 10.0 or greater (Example 9).

Examples 101 to 109 and Comparative Examples 101 to 106 (Without Pretreatment Liquid)

The same operation as in each of Examples 1 to 9 and Comparative Examples 1 to 6 was performed except that the application and drying of the pretreatment liquid were not performed.

As a result, in each of Examples 101 to 109 and Comparative Examples 101 to 106 (without the pretreatment liquid), the same results as those of each of Examples 1 to 9 and Comparative Examples 1 to 6 were obtained.

The disclosure of JP2022-48837 filed on Mar. 24, 2022 is incorporated herein by reference in its entirety.

All documents, patent applications, and technical standards described in the present specification are incorporated herein by reference to the same extent as in a case of being specifically and individually noted that individual documents, patent applications, and technical standards are incorporated by reference.

What is claimed is:

1. An ink jet recording method using an ink jet recording device that includes an ink jet head for jetting an ink, and a circulation flow passage for circulating the ink discharged from the ink jet head and returning the ink to the ink jet head, the method comprising:

circulating the ink in the circulation flow passage and jetting the ink from the ink jet head to apply the ink onto a recording medium, wherein the ink contains water and a white pigment which is a titanium dioxide particle, the number of white large particles which are particles having a particle diameter of 0.8 μm to 5 μm in the white pigment of the ink is $1.00\times10^{4}$ pieces/cm$^3$ or greater, the circulation flow passage includes a circulation tube connected to the ink jet head and returning the ink to the ink jet head, and a velocity ratio (1) defined by Equation (1) is $5.0\times10^{3}$ or greater and $1.4\times10^{5}$ or less, $$\text{Velocity ratio (1)} = Vc/(Vslp\times\log(Pn)) \quad \text{Equation (1)}$$

$$Vslp = \{(\rho-\rho w)gR^2\}/(18\eta) \quad \text{Equation (A)}$$

in Equation (1), Vc represents a circulation flow rate of the ink in units of cm/s in a connecting portion between the circulation tube and the ink jet head, Vslp represents a sedimentation velocity of the white large particles in units of cm/s, which is defined by Equation (A), Pn represents the number of the white large particles in the ink in units of pieces/cm$^3$, in Equation (A), ρ represents 4.23, ρw represents a density of a solvent in the ink in units of g/cm$^3$, g represents an acceleration of gravity in units of cm/s$^2$, R represents a median diameter of the white large particles in units of cm, and η represents a viscosity of the solvent in the ink at 30° C. in units of g/cm·s.

2. The ink jet recording method according to claim 1, wherein a velocity ratio (2) defined by Equation (2) is $1.5\times10^{3}$ or greater, $$\text{Velocity ratio (2)} = \text{velocity ratio (1)}\times(1-\cos\theta) \quad \text{Equation (2)}$$

in Equation (2), θ represents a contact angle of the ink in units of ° with respect to an inner surface of the circulation tube.

3. The ink jet recording method according to claim 1, wherein the ink is circulated through an ink tank, and a velocity ratio (3) defined by Equation (3) is 10.0 or greater, $$\text{Velocity ratio (3)} = \text{velocity ratio (1)}\times(1/L) \quad \text{Equation (3)}$$

in Equation (3), L represents a length of the circulation tube from the ink tank to the ink jet head in units of cm.

4. An ink jet recording device configured to be used in the ink jet recording method according to claim 1, the device comprising:

an ink jet head for jetting an ink containing water and a white pigment which is a titanium dioxide particle, and a circulation flow passage for circulating the ink discharged from the ink jet head and returning the ink to the ink jet head.

5. The ink jet recording device according to claim 4, wherein the circulation flow passage includes a circulation tube connected to the ink jet head and returning the ink to the ink jet head.

* * * * *